(12) United States Patent
Koll et al.

(10) Patent No.: US 9,659,055 B2
(45) Date of Patent: *May 23, 2017

(54) STRUCTURED SEARCHING OF DYNAMIC STRUCTURED DOCUMENT CORPUSES

(71) Applicant: MModal IP LLC, Franklin, TN (US)

(72) Inventors: Detlef Koll, Pittsburgh, PA (US); Juergen Fritsch, Pittsburgh, PA (US)

(73) Assignee: MModal IP LLC, Franklin, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/612,386

(22) Filed: Feb. 3, 2015

(65) Prior Publication Data

US 2015/0154168 A1    Jun. 4, 2015

Related U.S. Application Data

(63) Continuation of application No. 13/269,575, filed on Oct. 8, 2011, now Pat. No. 8,959,102.
(Continued)

(51) Int. Cl.
  *G06F 17/30* (2006.01)
  *G06F 17/27* (2006.01)

(52) U.S. Cl.
  CPC .... *G06F 17/30401* (2013.01); *G06F 17/2705* (2013.01); *G06F 17/3043* (2013.01); *G06F 17/3064* (2013.01); *G06F 17/30911* (2013.01)

(58) Field of Classification Search
  CPC .................. G06F 17/30911; G06F 17/30401
  See application file for complete search history.

(56) References Cited

U.S. PATENT DOCUMENTS 5,329,609 A    7/1994    Sanada
5,664,109 A    9/1997    Johnson
(Continued)

FOREIGN PATENT DOCUMENTS

JP    2003058559    2/2003
JP    2008077512 A    4/2008
(Continued)

OTHER PUBLICATIONS

Goldman, Roy, et al., "DataGuides: Enabling Query Formulation and Optimization in Semistructured Databases," VLDB '97 Proceedings of the 23rd International Conference on Very Large Data Bases, Aug. 26, 1997, pp. 436-445.
(Continued)

*Primary Examiner* — Alexey Shmatov
(74) *Attorney, Agent, or Firm* — Blueshift IP, LLC; Robert Plotkin

(57) ABSTRACT

A system includes a document corpus containing structured documents, which contain both text and annotations of the text. The system also includes a search engine which is adapted to perform structured searches of the structured documents. As new types of annotations are added to the system, the search engine is updated automatically to become capable of performing structured searches for the new types of annotations. For example, if a new natural language processing (NLP) component, adapted to generate annotations of a new type, is added to the system, then the system automatically updates a query language to include a definition of the new type of annotation. The search engine may then immediately be capable of processing structured queries which refer to the new type of annotation.

7 Claims, 6 Drawing Sheets

Related U.S. Application Data

(60) Provisional application No. 61/391,545, filed on Oct. 8, 2010.

(56) References Cited

U.S. PATENT DOCUMENTS

| | | | |
|---|---|---|---|
| 7,383,183 | B1 | 6/2008 | Davis |
| 7,725,330 | B2 | 5/2010 | Rao |
| 2001/0029322 | A1 | 10/2001 | Iliff |
| 2001/0042080 | A1 | 11/2001 | Ross |
| 2002/0147616 | A1 | 10/2002 | Pollard |
| 2003/0154085 | A1 | 8/2003 | Kelley |
| 2003/0195774 | A1 | 10/2003 | Abbo |
| 2004/0073458 | A1 | 4/2004 | Jensen |
| 2004/0172297 | A1 | 9/2004 | Rao |
| 2004/0254816 | A1 | 12/2004 | Myers |
| 2005/0137910 | A1 | 6/2005 | Rao |
| 2006/0161460 | A1 | 7/2006 | Smitherman |
| 2007/0011134 | A1 | 1/2007 | Langseth |
| 2008/0228769 | A1 | 9/2008 | Lita |
| 2009/0150388 | A1* | 6/2009 | Roseman ............. G06F 17/278 |
| 2009/0192822 | A1 | 7/2009 | Regulapati |
| 2010/0094657 | A1 | 4/2010 | Stern |
| 2010/0191721 | A1 | 7/2010 | Murthy |
| 2010/0250236 | A1 | 9/2010 | Jagannathan |
| 2011/0173153 | A1 | 7/2011 | Domashchenko |
| 2012/0158400 | A1* | 6/2012 | Schmidt ............. G06F 17/2785 704/9 |
| 2012/0215782 | A1 | 8/2012 | Jagannathan |

FOREIGN PATENT DOCUMENTS

| | | |
|---|---|---|
| JP | 2009199192 A | 9/2009 |
| KR | 1020060016933 | 2/2006 |
| WO | 9840835 | 9/1998 |

OTHER PUBLICATIONS

Goldman, Roy, et al., "From Semistructured Data to XML: Migrating the Lore Data Model and Query Language," 1999, 7 pp. Available at: http://infolab.stanford.edu/lore/pubs/xml.pdf.

International Search Report dated Oct. 20, 2010 issued in International Application No. PCT/US2010/00957.

Written Opinion dated Oct. 20, 2010 issued in International Application No. PCT/US2010/00957.

* cited by examiner

STRUCTURED SEARCHING OF DYNAMIC STRUCTURED DOCUMENT CORPUSES

BACKGROUND

Various techniques exist for creating structured documents from speech. Examples of such techniques are disclosed in U.S. Pat. No. 7,584,103, issued on Sep. 1, 2009, entitled, "Automated Extraction of Semantic Content and Generation of a Structured Document From Speech"; and U.S. Pat. No. 7,716,040, issued on May 11, 2010, entitled, "Verification of Extracted Data"; both of which are assigned to Multimodal Technologies, Inc. of Pittsburgh, Pa. Similarly, the product AnyModal CDS Speech Understanding, available from Multimodal Technologies, Inc., may be used to create structured documents from speech.

For example, if a doctor dictates a report of a patient visit, the doctor's speech may be transcribed not merely into a verbatim transcript of the dictated report, but instead into a structured document in which the text representing the transcribed speech is organized into sections, sub-sections, paragraphs, and other structures corresponding to concepts represented by the speech. Such concepts may, for example, be represented in the structured document by marking up the text using XML tags, such as those defined by the HL7 CDA document format or other format.

Sections, sub-sections, and other concepts may be annotated within the document using codes that indicate a semantic class of the concept, such as "CurrentMedications," "Findings," and "Discharge Instructions." Furthermore, transcribed text may be annotated with codes representing the meaning of the text in a computer-processable form, such as an "RxNorm" code for medications mentioned in the text, a post-coordinated SNOMED CT term describing a problem of a patient, or a complex data structure describing an allergy using information about the allergen, severity, and adverse reaction associated with the allergy.

Furthermore, the structured document may be annotated with header information that indicates the type of the document (such as "Discharge Summary" or "Progress Note") and context information (e.g., information about the patient who is the subject of the document, information about the physician who dictated the document).

These and other techniques for creating structured documents from speech are described in more detail in the two above-referenced U.S. Pat. Nos. 7,584,103 and 7,716,040. As indicated above, such structured documents include both text and codings (such as XML tags) associated with the text. The codings encode, in a computer-processable form, concepts represented by the corresponding text.

It is desirable to be able to search such structured documents to find relevant information as quickly, easily, and accurately as possible. Although some techniques for performing such searching exist, there is a need for improved techniques for searching structured documents, particularly when such structured documents are part of a dynamic corpus of structured documents which grows and changes over time.

SUMMARY

A system includes a document corpus containing structured documents, which contain both text and annotations of the text. The system also includes a search engine which is adapted to perform structured searches of the structured documents. As new types of annotations are added to the system, the search engine is updated automatically to become capable of performing structured searches for the new types of annotations. For example, if a new natural language processing (NLP) component, adapted to generate annotations of a new type, is added to the system, then the system automatically updates a query language to include a definition of the new type of annotation. The search engine may then immediately be capable of processing structured queries which refer to the new type of annotation.

DETAILED DESCRIPTION

Figure 1:
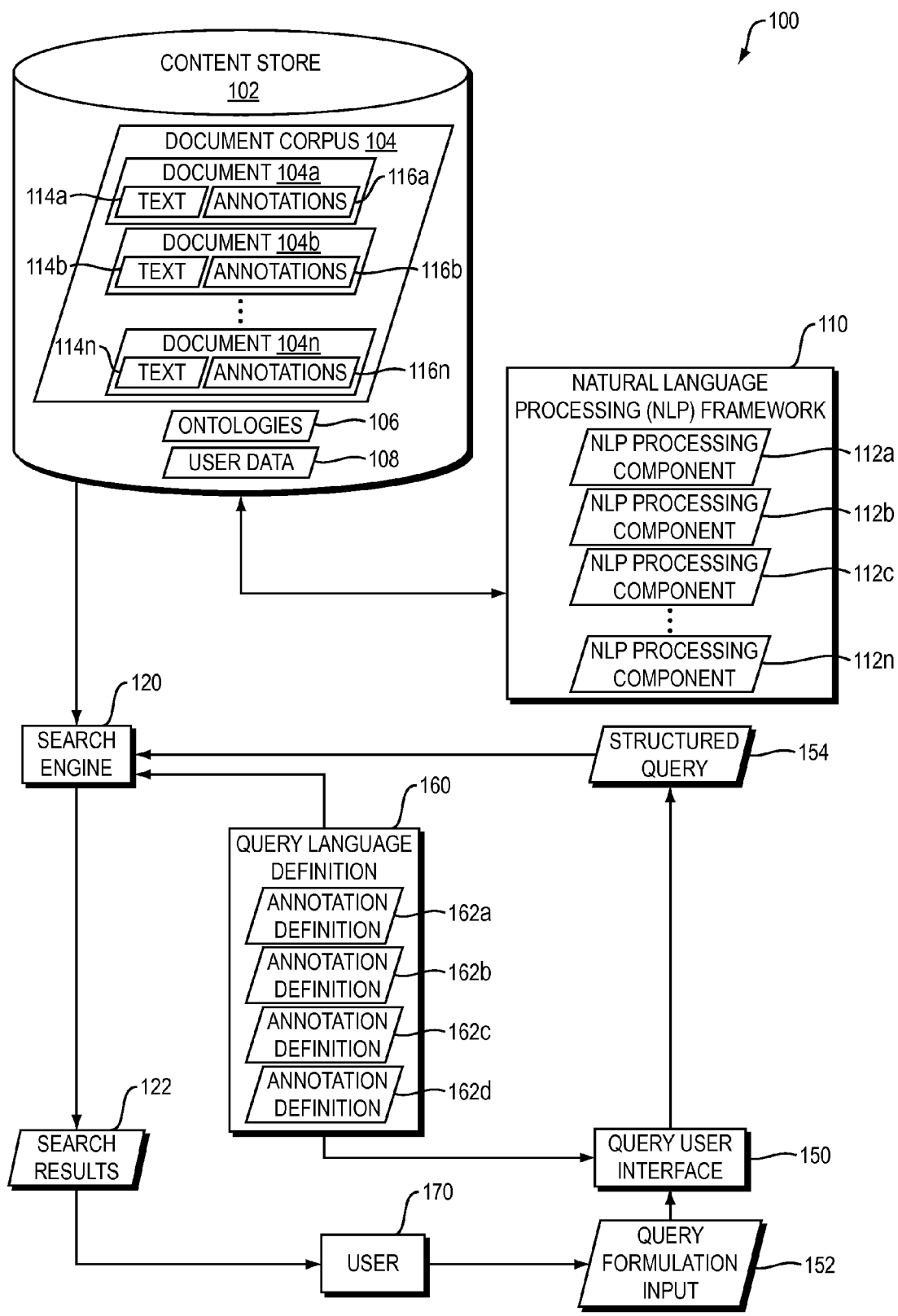
FIG. 1 is a dataflow diagram of a system for performing structured searches of structured documents in a document corpus according to one embodiment of the present invention.

One function performed by certain embodiments of the present invention is to execute structured searches on structured documents. As described above, a "structured document" is one in which the text and/or other content has been annotated with codings, which indicate the (semantic and/or syntactic) meaning of the content corresponding to the codings.

A "structured search" is one which executes a query that makes specific reference to a document structure. Such a query is a "structured query." For example, assume that structured documents in a particular structured document corpus use an annotation of type <allergy> to store information about the allergies of patients. In this case, a query that is formulated to identify all patients with a penicillin allergy, and which does so using a construction such as "<allergy>=penicillin" is a structured query, because the query makes specific reference to a document structure, namely the <allergy> annotation. A search which executes such a query is a structured search. A search engine which performs such a search may search only within <allergy> annotations in the document corpus for the text "penicillin" (or for other tokens representing penicillin).

In contrast, a query such as "penicillin allergy" is an unstructured query because it consists merely of the flat text "penicillin allergy." Such a query does not make reference to any document structure. As a result, such an unstructured search is likely to produce less accurate results than a structured search, because the unstructured search may:

produce false positives in response to encountering the text "penicillin allergy" even when such text does not indicate that a patient currently has a penicillin allergy (e.g., the text may instead indicate that the patient's mother had a penicillin allergy); and produce false negatives by, for example, failing to recognize that text other than "penicillin allergy" (e.g., "PCN allergy") indicates that a patient currently has a penicillin allergy.

Structured searches, therefore, are advantageous because they can produce results that are more relevant than unstructured searches. Structured queries, however, are more tedious and time-consuming to generate, because they must make reference not only to the content (e.g., text) to be found, but also to the specific type(s) of annotation(s) within which such content is to be found. For a human operator to generate such a query for execution over a particular document corpus, therefore, the human operator must know which types of annotations are available for searching within that document corpus. This can be difficult for the human operator to do, particularly if the number of annotation types is very large, and if the number of annotation types grows over time as a result, for example, of new documents, containing types of annotations not previously present in the document corpus, are added to the document corpus.

Furthermore, for a system to execute a structured query, the document corpus to be searched must first be annotated into a structured form. This requires designing and building components for performing such annotation. As a result, one disadvantage of structured queries is that an up-front investment in transforming unstructured content into structured content is required before structured queries can be performed on such content. Executing unstructured queries, in contrast, requires no such up-front investment because unstructured queries can be performed on unstructured content.

Furthermore, the generation of structured queries is subject to error. A human operator may, for example, erroneously formulate a query for "<irritant>=penicillin" instead of "<allergen>=penicillin." Attempting to execute such a query may cause an error or a failure to find any matching documents.

Some existing systems assist the user in formulating structured queries. For example, some systems include a query formulation user interface which provides the user with a drop-down list of permissible terms (such as names of annotation types) which may be inserted into the query at the current cursor location. For example, such a user interface may provide the user with a drop-down list including choices of annotation type such as "<allergy>," "<current-medication>," and "<prognosis>." Similarly, other query formulation user interfaces provide an "auto-complete" feature which prompt the user with permissible terms to complete the term currently being typed by the user. For example, if the user types "<all>", the system may prompt the user with the terms "<allergy>" and "<allergen>," from which the user may select to complete the current term within the query.

To provide the user with such assistance, any such query formulation user interfaces must have knowledge of the set of annotation types which exist within the document corpus to be searched, and which therefore are permitted to be included within queries. A query language may include definitions of a set of annotation types, and the query formulation user interface may be programmed with knowledge of the query language and therefore of the annotation types within the query language. Providing the query formulation user interface with the ability to recognize new annotation types may therefore require the query language to be updated. Updating the query language, or otherwise updating the query formulation user interface to include complete, accurate, and current knowledge of all annotations within the document corpus can be a difficult task, particularly if the document corpus to be searched grows and changes over time, and if the number and type of annotations available for searching within the document corpus grows and changes over time.

The query formulation user interface may be hard-coded or otherwise programmed with knowledge of the query language. As a result, the query formulation user interface may be capable of assisting the human operator in formulating structured queries that make specific reference to annotations such as "<allergy>," "<allergen>," and "<severity>."

Furthermore, assume that a particular search engine is deployed for use in searching a particular document corpus. Before such deployment, the search engine may be hard-coded with knowledge of the set of annotation types within the document corpus, such as by programming the search engine to have knowledge of a query language which includes definitions of the set of annotation types. The query language may include definitions of relationships of codes to each other within a particular ontology. For example, the query language may indicate that the "<allergy>" type of annotation has sub-annotations (sub-codes) such as "<allergen>" and "<severity>". As a result, a search engine which has knowledge of the query language may be capable of executing structured queries which make reference to annotation types such as "<allergy>," "<allergen>," and "<severity>."

Such a system, however, faces difficulties when new annotation types (i.e., annotation types not previously hard-coded into the search engine and/or query formulation user interface) are introduced. Such new annotation types may, for example, be introduced by adding to the document corpus a new structured document containing a new annotation type, or by adding a new unstructured document to the document corpus and then applying natural language processing (NLP) to the new document and thereby adding annotations to the new document, including one or more annotations having new types.

In such a system, the search engine may not be capable of processing structured queries which make reference to the new annotation types, because the query language being used by the search engine does not include definitions of the new annotation types. Similarly, the system's query formulation user interface may not be capable of prompting the user with the new annotation types because the query language being used by the query formulation user interface does not have knowledge of the new annotation types.

Typically, to address these problems in existing systems, it is necessary for a system administrator or other human user to manually update the query language, or otherwise to update the search engine and/or query formulation user interface, with knowledge of the newly-added annotation types. Requiring such manual updates can be tedious, time-consuming, and error prone. Even when such updates are performed accurately, there is some inherent delay between the addition of the new annotation types to the document corpus and the time at which the query language is updated to reflect the new annotation types, and therefore the time at which the search engine and query formulation user interface obtain knowledge of the new annotation types, thereby resulting in a period of time in which users of the system are not able to make optimal use of the system.

The codings within a document corpus may change over time in other ways that cannot be predicted in advance. For example: (1) the needs of the users of the document corpus may evolve over time as a result of, for example, changes in regulations, modifications to treatment regimens, and the needs of new research studies; (2) ontologies may evolve over time by adding or refining terms, deprecating old terms, and replacing deprecated terms with new ones; and (3) natural language processing (NLP) algorithms may evolve over time, and as a result it may be possible to re-process and thereby re-code (re-annotate) previously encoded documents in the document corpus to improve the accuracy of codings in the text. Therefore, to ensure that documents remain as useful as possible over time, it is necessary to have the ability to modify the markup within a document over time in response to the changes listed above. Existing systems, however, are not capable of automatically updating their search engines and query formulation user interfaces in response to such markup modifications.

Embodiments of the present invention address these and other shortcomings of existing structured searching systems, by enabling the search engines, query formulation user interfaces, and other components of structured searching systems to be updated immediately and automatically with knowledge of annotation types which have been added to a document corpus.

Before describing particular embodiments of the present invention, the process of executing structured searches in general will first be described in more detail. The process of performing a structured search on a document corpus involves two high-level steps:

(1) selection (e.g., finding all patients represented within the document corpus who are allergic to penicillin and who are between 30 and 40 years old); and (2) projection (e.g., retrieving, for each such patient, the portion(s) of the document(s) for the patient that discuss the patient's current medications).

Selection queries may take any of a variety of forms, such as any of the below, either individually or in any combination with each other:

Free form text searches.
Free form text searches, restricted to certain concepts (e.g., sections) in the document (e.g., "Penicillin in Allergy Section").
Coding (annotation) searches, such as:
  Searches for the presence or absence of a particular code from an ontology.
  Searches for the presence of a generalization of a code (e.g., a search for the code "Neoplasm" may match both codes of the type "Neoplasm" and any codes in the ontology that are related to the "Neoplasm" code by an isA-relationship expressed in the ontology).
  Searches for codes (or generalizations of codes) within a given scope (e.g., negation, polarity (e.g., "possible" and "likely"), temporal, or subject scope).
  Searches for complex annotations, in which the query specifies not only the value(s) to be matched but also the component(s) (sub-code(s)) within the complex annotation that is/are to be matched against the value(s). For example, in an "allergy" complex annotation, a query might specify a search for "penicillin" in the "allergen" field (sub-annotation) of the "allergy" annotation.
Context information searches performed on context information in the header (e.g., patient name, patient age, treating physician(s), document type, document title), such as:
  Range searches (e.g., visit date, patient age).
  Free form text searches (e.g., patient name, document title).
  Searches for coded information (e.g., document type, reason for encounter), where such searches may be generalized by using an ontology to expand the query term. For example, searches for a "note" type of document may be generalized to search both for documents of type "note" and for documents whose type is a sub-type of "note."

A selection query may, for example, be a structured query, an unstructured query, or a combination of a structured query and an unstructured query (referred to herein as a "mixed query").

The projection of a query determines which information (e.g., part or aggregation of the document set identified by the selection) is to be returned as the result of the query. Projections may specify, for example, that any one or more of the following are to be returned as the result of the query:

Certain sections of each matching document, as identified by the selection term (e.g., the "Current Medications" section).
Codings of a certain type within each matching document (e.g., codings of type "<allergy>").
Context information for each matching document (e.g., patient name, patient age, treating physician).
Aggregated information from the set of all matching documents (e.g., a count of all matches, facets of matches).

Having generally described certain features of structured documents and certain techniques for creating structured documents according to embodiments of the present invention, certain techniques for searching structured documents according to embodiments of the present invention will now be described.

In one embodiment of the present invention, as illustrated in FIG. 1, a system 100 includes a content store 102, which contains a plurality of structured documents 104a-n (referred to collectively herein as document corpus 104), where n may be any number. The content store 102 also contains data related to the document corpus 104, such as ontologies 106 used by the structured documents 104a-n and user information 108. Documents 104a-n in the content store 102 may, for example, be represented in an XML format. Each of the documents 104a-n may include text and corresponding markup (also referred to herein as "annotations" or "codings"). More specifically, document 104a includes text 114a and corresponding markup 116a; document 104b includes text 114a and corresponding markup 116b; and document 104n includes text 114n and corresponding markup 116n.

The system 100 also includes a natural language processing (NLP) framework 110, which may be used to annotate (encode) unstructured or semi-structured data (such as plain text documents) and thereby create structured documents, which may be added to the content store 102. For example, the markup 116a-n in the existing structured documents 104a-n may previously have been generated by the NLP processing framework 110 and added to unstructured documents to produce the structured documents 104a-n. The NLP framework may perform any kind of markup on the documents that it processes, such as recognizing sections within the documents and marking them up as discrete sections, and performing general term-matching against the ontologies 106 (such as SNOMED CT), and marking up any matched terms using codes from the ontologies 106.

More generally, the NLP processing framework 110 may recognize any kind of concept disclosed within the above-referenced U.S. Pat. Nos. 7,584,103 and 7,716,040, and may mark up documents (such as the structured documents 104a-n) with annotations representing such recognized concepts accordingly. Such concepts may be encoded in any of a variety of ways. For example, certain concepts may be encoded as a single value. A "Systolic Blood Pressure Measurement" concept, for example, may be encoded using a single number representing a particular patient's systolic blood pressure measurement.

Concepts may, however, be complex in that they may be represented using multiple values. For example, the concept "Systolic Blood Pressure Measurement" may further include information about the device that was used to measure the patient's blood pressure, and information about the state of the patient when the patient's blood pressure was measured (e.g., whether the measurement was taken with the patient standing or laying down, after exertion or at rest, etc.).

As another example, a "Smoking Status" concept may be encoded using fields (also referred to herein as "sub-annotations" and "sub-codes") containing values representing: (1) the smoking status of the patient (e.g., current smoker, past smoker, or non-smoker); (2) how much the patient currently smokes (measured, e.g., in packs per day); and (3) for past smokers, when the patient stopped smoking.

As mentioned above, such concepts may be represented within a document using a combination of text and markup of the text (e.g., XML tags). In general, the markup corresponding to particular text specifies a (semantic and/or syntactic) concept represented by the particular text.

The system 100 also includes a query language definition 160, which includes definitions 162a-d of a plurality of annotation types. Although four definitions 162a-d are shown in FIG. 1, the query language definition 160 may include any number of annotation type definitions. In general, each of the annotation type definitions 162a-d defines relevant properties of a particular corresponding type of annotation, such as the symbol which represents the annotation type within a coding (such as the symbol "<allergy>"), the annotation type's permissible sub-annotation types, and permissible values for use within instances of the annotation type. Each annotation definition may define a type of annotation for encoding a particular concept; different types of annotations may encode different concepts. Although the query language definition 160 may define other aspects of the corresponding query language, only the annotation definitions 162a-d are shown in FIG. 1 for ease of illustration.

The system 100 also includes a search engine 120 for performing structured searches on the document corpus 104 and a query formulation user interface 150 for assisting a user 170 in formulating structured queries to be processed by the search engine 120. More specifically, the user 170 provides query formulation input 152 to the query formulation user interface 150, such as textual input representing a partial or complete query, mouse input selecting one or more terms from a drop-down list of terms, or any combination thereof. The query formulation user interface 150 produces, based on the query formulation input 152, a structured query 154, and provides the structured query 154 to the search engine 120. The search engine 120 performs a structured search of the document corpus 104 by processing the query 154, and returns the search results 122, if any, to the user 170.

Components of the system 100, such as the NLP processing framework 110, the search engine 120, and the query formulation user interface 150, may operate directly on the document corpus 104 and the text 114a-n and annotations 116a-n it contains, or operate through an intermediate document model (not shown) of the text 114a-n and markup 116a-n. For example, any one or more of these components 110, 120, and 150 may represent concepts within the documents 104a-n using data objects, such as JavaBeans. A different object class may be defined for each concept (annotation) type, and each data object may be an instance of a particular object class. Each class may define its own set of methods for accessing values stored within the data object. For example, a "SmokingStatus" class, which corresponds to a "SmokingStatus" annotation type, may define methods such as getStatus( ) getPacksPerDay( ) and getDateStoppedSmoking( ).

This use of object classes and data objects, however, is not a requirement of the present invention. Therefore, the following description will describe the direct processing of text 114a-n and annotations 116a-n within the document corpus 104, without the use of object classes and data objects. However, those having ordinary skill in the art will understand how to modify the techniques described herein to use object classes and data objects, and to perform the same functions in other ways.

Components of the system 100, such as the NLP processing framework 110, search engine 120, and query formulation user interface 150 may have access to the query language definition 160. As a result, the search engine 120 may, as a result of its access to the query language definition 160, be capable of performing structured searches by processing structured queries which make reference to annotation types defined by the current set of annotation definitions 162a-d in the query language 160 at a particular point in time. Conversely, the search engine 120 may be incapable of performing structured searches by processing structured queries which make reference to annotation types not defined by the current set of annotation definitions 162a-d in the query language 160 at a particular point in time. For example, in the case of FIG. 1, if a structured query makes reference to an annotation type not defined by any of the annotation type definitions 162a-d in the query language 160, the search engine 120 may signal an error or fail to execute such a query correctly.

Similarly, the query formulation user interface 150 may, as a result of its access to the query language definition 160, be capable of providing a user with assistance in formulating structured queries that make reference to annotation types defined by the current set of annotation definitions 162a-d in the query language 160 at a particular point in time. For example, the query formulation user interface may be capable of providing the user with a drop-down list of labels representing the annotation types 162a-d defined by the query language 160, and/or of providing auto-completion of labels representing the annotation types 162a-d defined by the query language 160.

Conversely, the query formulation user interface 150 may be incapable of providing the user with assistance in formulating structured queries that make reference to annotation types not defined by the current set of annotation definitions 162a-d in the query language 160 at a particular point in time. For example, the drop-down lists provided by the query formulation user interface 150 may not include labels representing annotation types not defined by the current set of annotation definitions 162a-d in the query language 160 at a particular point in time, such as labels representing types of annotations which have been added to the document corpus 104 since the query language definition 160 was created or last updated. Similarly, the query formulation user interface 150 may not be capable of auto-completing labels representing annotation types not defined by the current set of annotation definitions 162a-d in the query language 160 at a particular point in time.

Examples of techniques which may be used to overcome these problems in accordance with embodiments of the present invention will now be described. Consider the system 200a illustrated in FIG. 2A, which may be an instance of the system 100 of FIG. 1, but at an earlier time than that illustrated in FIG. 1. In particular, in FIG. 2A, the NLP processing framework 110 includes only a single NLP processing component 112a for recognizing that content should be marked up with a particular type of annotation, and for generating and inserting instances of that type of annotation within documents in the document corpus 104. For purposes of example, assume that the NLP processing component 112a recognizes and generates annotations of the type "SystolicBloodPressure," for annotating content which represents the systolic blood pressure of a patient.

Figure 2A:
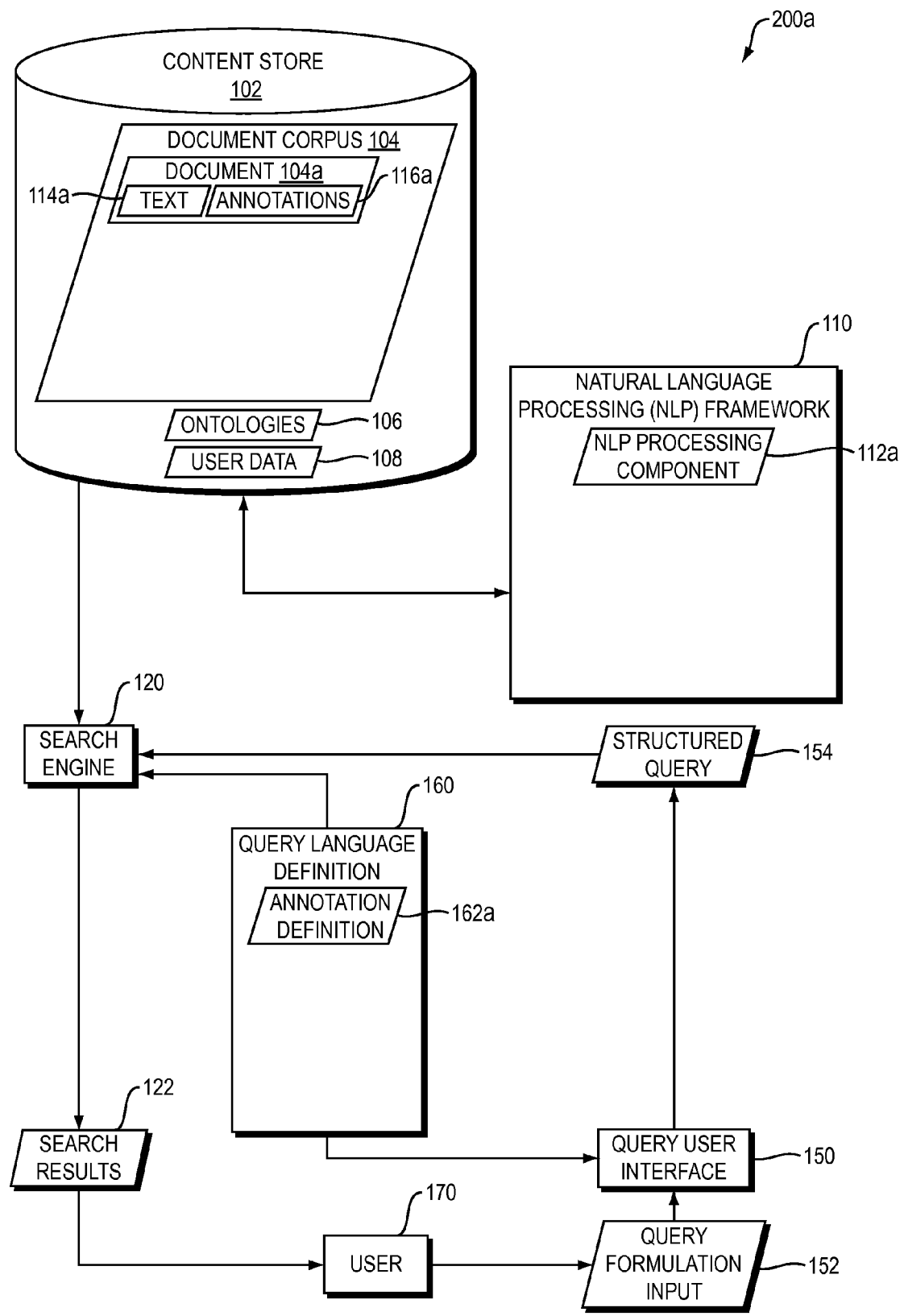
FIGS. 2A-2D are dataflow diagrams illustrating intermediate steps in the process of creating the system of FIG. 1.

Similarly, in FIG. 2A, the document corpus 104 contains only a single document 104a, containing text 114a and corresponding annotations 116a. Assume for purposes of example that the text 114a includes text representing the systolic blood pressure of a patient, and that such text is annotated (marked up) by an annotation of the type "SystolicBloodPressure" in the corresponding annotations 116a. This annotation may have been generated by the NLP processing component 112a in response to scanning the document 104a and recognizing that the document 104a contained text representing the systolic blood pressure of a patient.

The query language definition 160 in FIG. 2A contains only a single annotation definition 162a. Assume for purposes of example that the annotation definition 162a defines the annotation type "SystolicBloodPressure." Therefore, the query formulation user interface 150 is capable of assisting users in formulating structured queries which refer to the "SystolicBloodPressure" annotation type, and the search engine 120 is capable of performing structured searches by processing such structured queries.

At the point in time illustrated in FIG. 2A, therefore, the search engine 120 may be incapable of performing structured searches by processing structured queries which make reference to annotation types other than the "SystolicBloodPressure" annotation type. For example, an attempt by a user to use the search engine 120 to perform a structured search by processing a query which refers to a "SmokingStatus" annotation type make cause the search engine 120 to signal an error or fail to execute such a query correctly. Similarly, at the point in time illustrated in FIG. 2A, the query formulation user interface 150 may be incapable of providing the user with assistance in formulating structured queries that make reference to annotation types other than the "SystolicBloodPressure" annotation type, such as a "SmokingStatus" annotation type.

Now consider the system 200b illustrated in FIG. 2B, which may be an instance of the system 100 of FIG. 1, but at an earlier time than that illustrated in FIG. 1, and at a later time than that illustrated in FIG. 2A. Furthermore, consider FIG. 3, which shows a flowchart of a method 300 which is performed by the system 200b of FIG. 2B in one embodiment of the present invention.

Figure 2B:
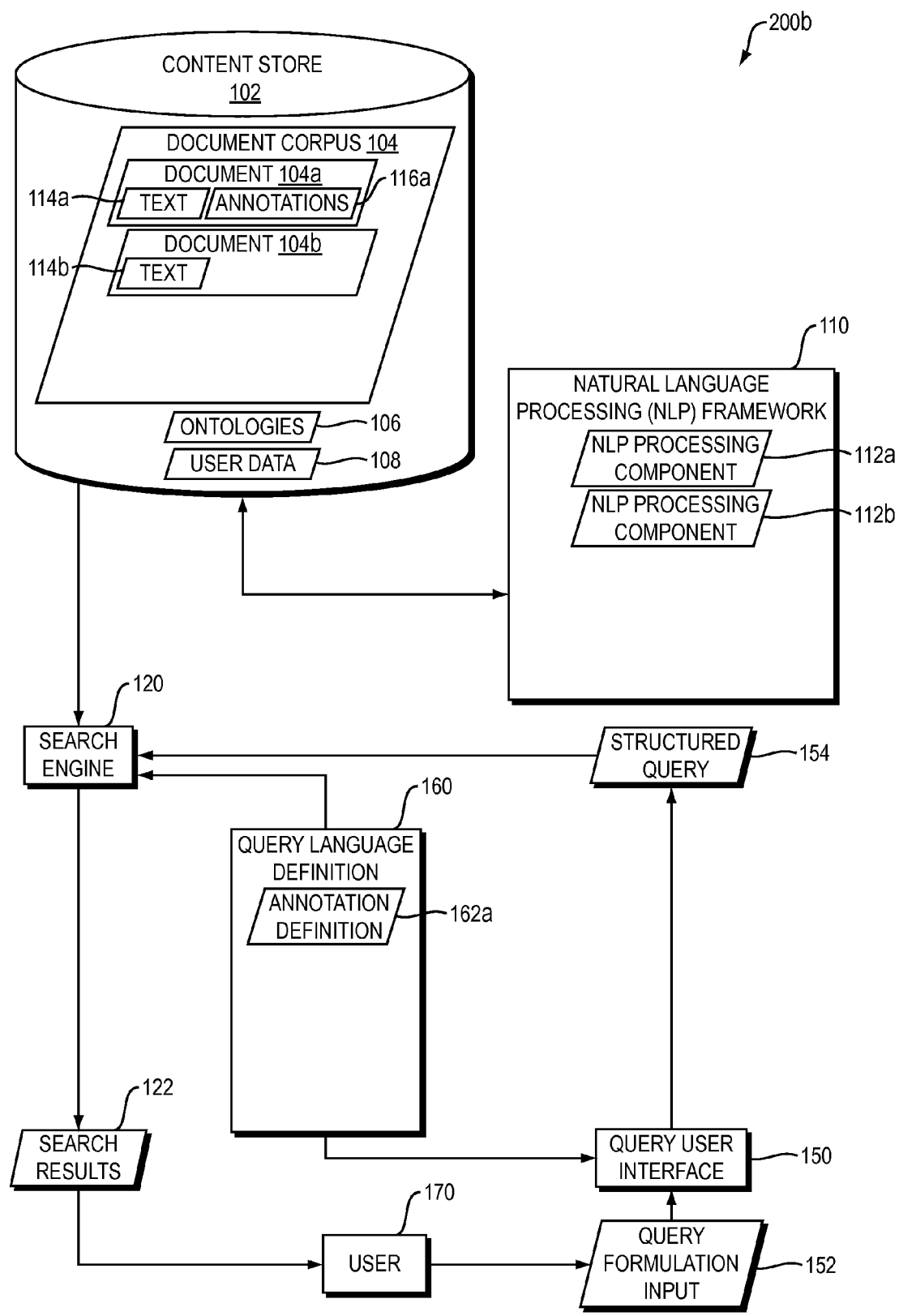
Figure 3:
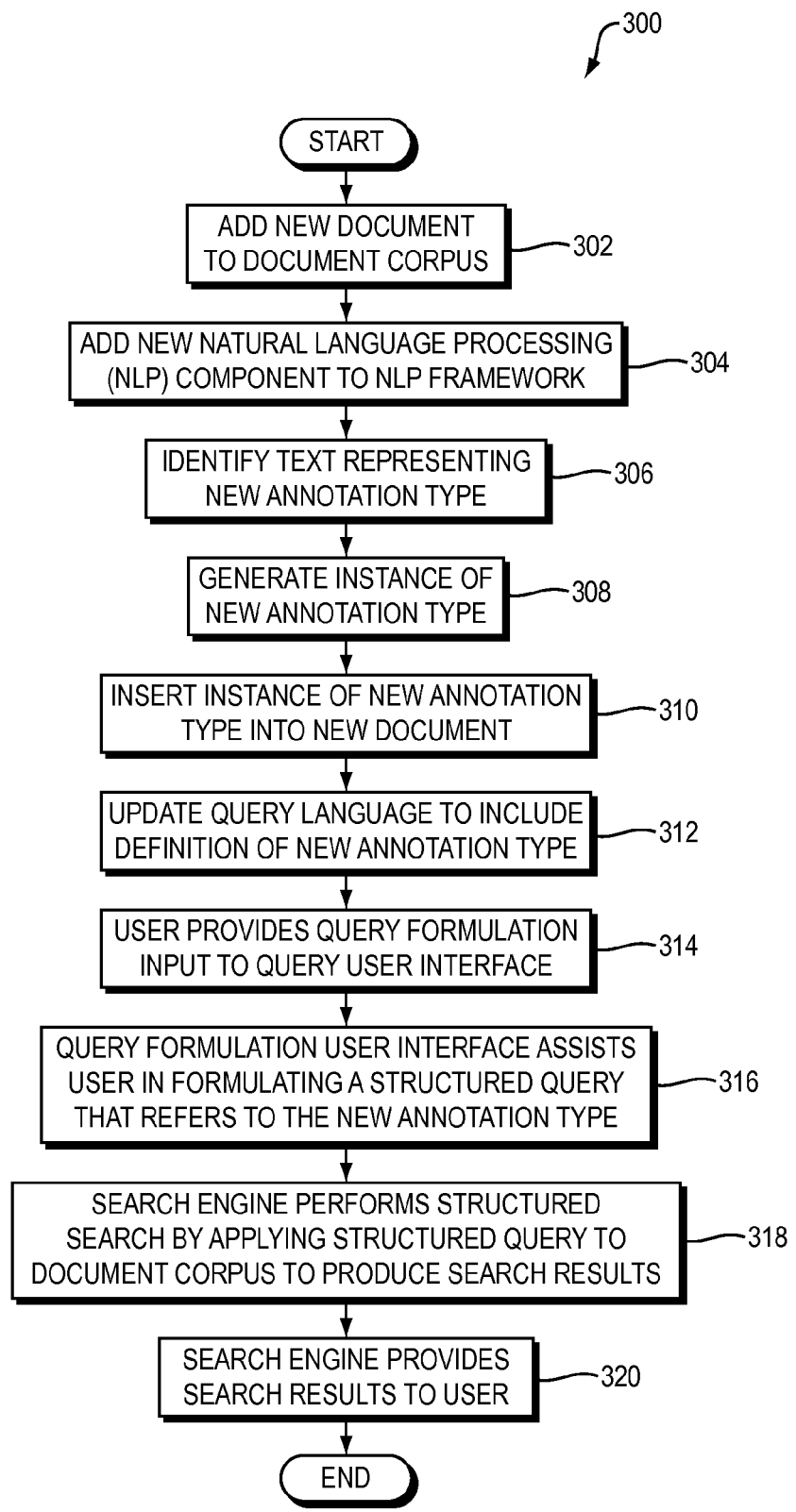
FIG. 3 is a flowchart of a method performed by the systems of FIGS. 1 and 2A-2D to automatically adapt to become capable of performing structured searches for new types of annotations within documents in the document corpus.

In particular, in FIG. 2B, a new document 104b has been added to the document corpus 104 (FIG. 3, step 302). The new document 104b includes text 114b which represents the smoking status of a patient. In the particular example shown in FIG. 2B, the document 104b is a plain text document, and therefore does not include any annotations of the text 114b.

In FIG. 2B, a new NLP processing component 112b has been added to the NLP processing framework 110 (FIG. 3, step 304). The NLP processing component 112b is capable of: (1) recognizing text that represents the smoking status of a patient, and (2) generating and inserting instances of the "SmokingStatus" annotation type into documents to annotate such text.

The NLP processing framework 110 may use the new NLP processing component 112b to recognize the text within the new document 104b that represents the smoking status of a patient (FIG. 3, step 306). Assume, for the sake of simplicity, that exactly one passage within the text 114b in the new document 104b represents the smoking status of a patient. In this case, the NLP processing component 112b may recognize such text, generate an annotation which is an instance of the "SmokingStatus" annotation type (FIG. 3, step 308), and insert the annotation within the document 104b as annotation 116b (FIG. 3, step 310). Inserting the annotation 116b within the document 104b may include associating the annotation 116b with the corresponding text 114b (such as by using XML tags) so that the text 114b and annotation 116b may subsequently be correlated with each other. The result is illustrated by the system 200c of FIG. 2C.

The NLP processing framework 110 may, for example, perform steps 306-310 by applying all of the current NLP processing components 112a-b to the new document 104b, in response to the addition of the new document 104b to the document corpus 104.

Alternatively, for example, the NLP processing framework 110 may perform steps 306-310 by applying only the new NLP processing component 112b to all of the documents 104a-b in the document corpus. In this case, any text in the existing document 104a which represents the smoking status of a patient would also be annotated with an annotation of the type "SmokingStatus." The NLP processing framework 110 may periodically (e.g., hourly, daily, or weekly) apply all of the NLP processing components in the NLP processing framework 110 to all of the documents in the document corpus 104 to ensure that the annotations in the document corpus 104 are as up-to-date as possible.

The NLP processing framework 110 may, therefore, generate instances of new annotation types even when no new documents have been added to the document corpus 104. For example, consider again the system of FIG. 2A, in which the document corpus 104 includes only document 104a. Assume now that document 104a includes both text representing the systolic blood pressure of a patient and text representing the smoking status of a patient. If the NLP processing framework 110 of FIG. 2A processes the document 104a, the NLP processing framework 110 will use the NLP processing component 112a to generate an annotation of the type "SystolicBloodPressure" within the document 104a, but will not generate an annotation of the type "SmokingStatus" to the document 104a because the "SmokingStatus" NLP processing component 112b of FIG. 2B has not yet been added to the NLP processing framework 110 of FIG. 2A.

However, if the "SmokingStatus" NLP processing component 112b is added to the NLP processing framework 110, as shown in FIG. 2B, and the NLP processing framework then applies the "SmokingStatus" NLP processing component 112b to the (unmodified) text 114a of the document 104a, the "SmokingStatus" NLP processing component 112b will recognize the text representing the smoking status of a patient within the document 104a, and generate a "SmokingStatus" annotation within the document 104a accordingly. As this example illustrates, the addition of new documents to the document corpus 104 is not necessary for the creation of instances of new annotation types.

A similar result would be produced if the original document 104a were modified by adding text to it representing the smoking status of a patient. In this case, applying the new "SmokingStatus" NLP processing component 112b to the modified version of document 104a would cause the NLP processing component 112b to recognize the modified text and generate and insert a "SmokingStatus" annotation within the document 104*a* according. This further illustrates that the addition of new documents to the document corpus 104 is not necessary for the creation of instances of new annotation types.

The query language definition 160 is updated to include a definition of the new annotation type (i.e., the annotation type recognized by the new NLP processing component 112*b*) (FIG. 3, step 312). As a result, the query language definition 160 includes a definition 162*b* of the new annotation type, as illustrated by the system 200*d* of FIG. 2D.

Such an update may be performed in various ways. For example, the query language definition 160 may be updated in response to the addition of an annotation of a new type to the document corpus 104 (e.g., the annotation 116*b*). An annotation is of a "new" type if the annotation's type does not have a corresponding annotation definition in the query language definition 160. Such an annotation may, for example, be the first of its type to appear within the document corpus 104. The query language definition 160 may, for example, be modified automatically (e.g., by the natural language processing framework 110) or manually by a human user of the system 200.

For example, if the query language definition 160 does not include a definition of the "SmokingStatus" annotation type and the NLP processing framework 110 adds an annotation of type "SmokingStatus" to one of the documents 104*a-n* in the document corpus 104, then such an annotation is an annotation of a "new" type. The system 100 may update the query language definition 160 in response to the addition of such an annotation to the document corpus 104.

Figure 2C:
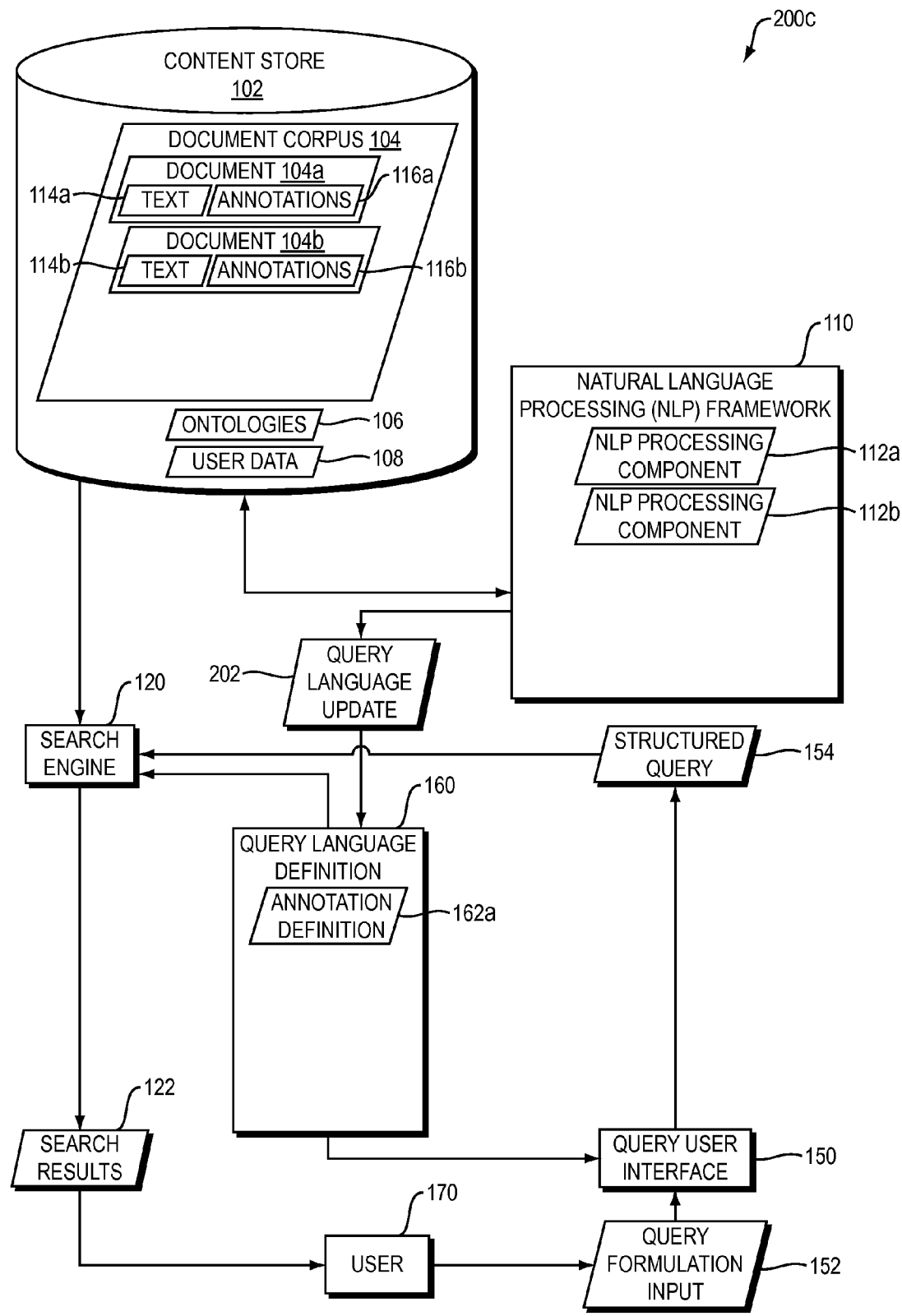
Figure 2D:
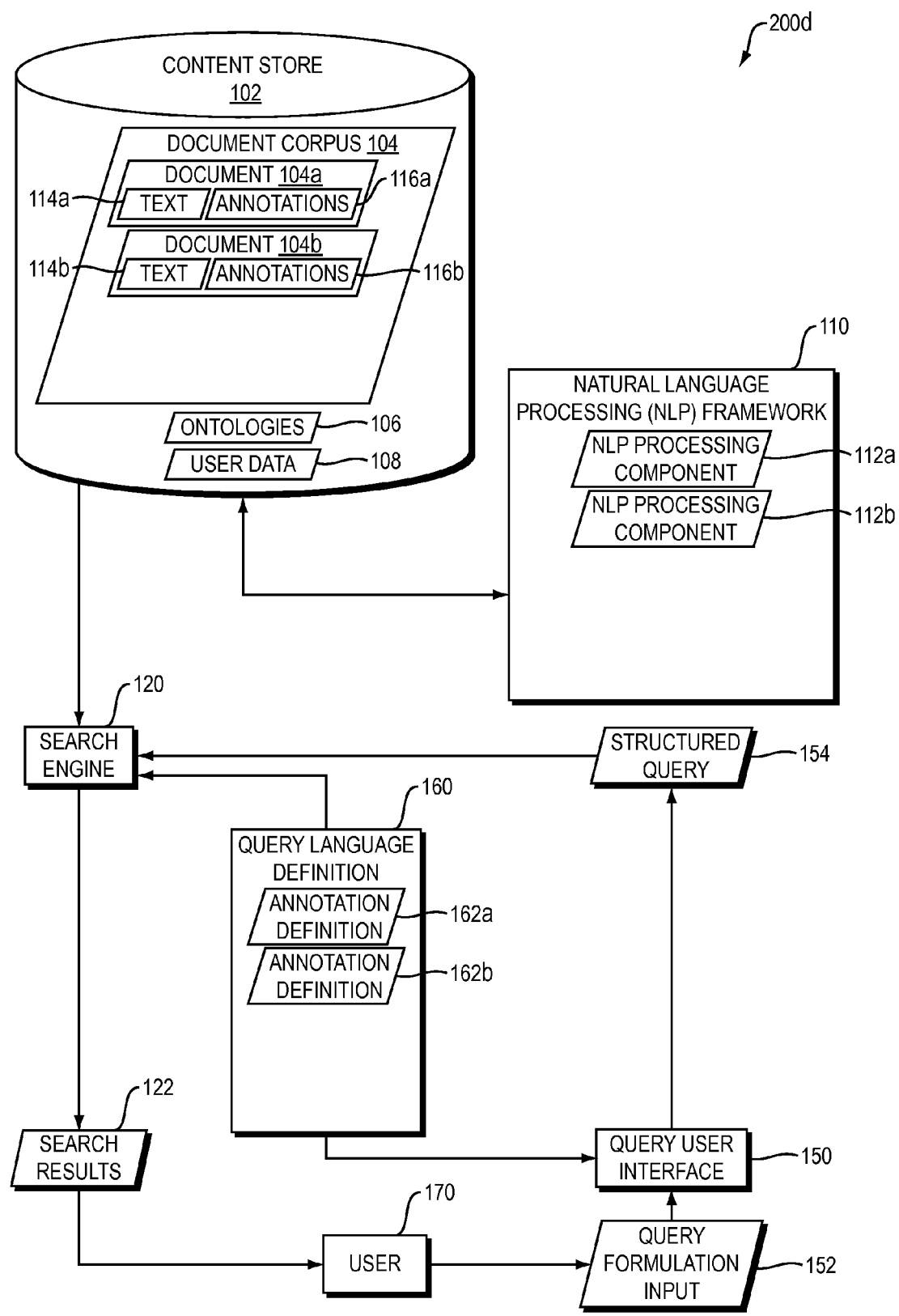

The addition of an annotation of a new type to the document corpus 104 may be detected in any of a variety of ways. For example, the NLP processing framework 110 may, upon the first use of a new NLP processing component (such as NLP processing component 112*b*) to insert a corresponding annotation into the document corpus 104, determine that an annotation of a new type has been added to the document corpus 104 and, in response to such determination, the NLP processing framework 110 may send a query language update 202 to the query language definition 160 (FIG. 2C). The query language update 202 may include the new annotation definition 162*b* and a corresponding instruction to add the new annotation definition 162*b* to the query language definition 160. In response to receiving the update 202, the query language definition 160 may be updated to include the annotation definition 162*b* (if the query language definition 160 does not already include the annotation definition 162*b*).

As another example, the NLP processing framework 110 or some other component of the system 100 may periodically parse the document corpus 104 by applying natural language processing to detect annotations of new types, such as by identifying annotations having types which did not occur within the document corpus 104 the last time it was scanned, or by identifying annotations having types not having definitions within the query language definition 160. In response to detecting such a new annotation type, the query language definition 160 may be updated to include a definition of the new annotation type.

Note that documents having annotations of new types need not have been annotated using the NLP processing framework 110. For example, a document containing pre-existing annotations not generated by the NLP processing framework 110 may be imported into the document corpus 104. As another example, a document within the document corpus 104 may be annotated manually or using some other mechanism other than the NLP processing framework 110. Such a document may be scanned (with or without the use of the NLP framework 110) to identify annotations of new types, which may be used to update the query language definition 160.

An annotation having a new type may or may not have a type capable of being recognized by the NLP processing component 112*a* in the NLP processing framework 110. For example, a new document containing a pre-existing annotation of type "CurrentMedications" may be imported into the document corpus 104, even though none of the NLP processing components 112*a-n* in the NLP processing framework 110 is capable of: (1) recognizing content representing the current medications of a patient; or (2) generating annotations of type "CurrentMedications." Nonetheless, annotations of type "CurrentMedications" in the new document may be identified by the system 100 and used to trigger an update of the query language definition 160. As these examples illustrate, a new type of annotation may be detected, and a corresponding annotation definition may be added to the query language definition 160, even if no new NLP processing component is added to the NLP processing framework 110.

Furthermore, modifications to existing types of annotations may be detected using similar techniques to those described above. For example, if the system 100 scans a new or existing document in the document corpus 104 and detects an annotation of an existing type, but which contains a field (sub-code) which is not reflected in the corresponding annotation definition in the query language definition 160, the system 100 may update that annotation definition to reflect the newly-discovered field.

Furthermore, the mere addition of a new NLP processing component (i.e., an NLP processing component which is capable of generating annotations of a type which does not have a corresponding annotation definition in the query language definition 160) may trigger an update of the query language definition 160 to include a definition of the type of annotation capable of being generated by the new NLP processing component. The query language definition 160 may be updated in response to the addition of such a new NLP processing component whether or not annotations of the type capable of being generated by the new NLP processing component occur within the document corpus 104.

Once the query language definition 160 has been updated to include the new annotation definition 162*b*, the user may then provide query formulation input 152 to the query formulation user interface 150 (FIG. 3, step 314), during which the query formulation user interface 150 may assist the user 170 in formulating a structured query that refers to the new annotation type (FIG. 3, step 316).

The query formulation user interface 150 may take any of a variety of forms. For example, it may include a text-based user interface through which the user 170 may type the query 154. As another example, the user interface 150 may include a graphical user interface through which the user 170 may select keywords (such as "GET" and "FOR"), the names of annotation types and fields (such as "SmokingStatus" and "packsPerDay"), and Boolean connectors (such as "AND" and "OR") to form the query 154.

As mentioned above, the query formulation user interface 150 has access to the query language definition 160 and therefore may prompt the user with the name of the new annotation type, or otherwise provide assistance related to the new annotation type, even if the definition 162*b* of the new annotation type has just been added to the query language definition 160. In other words, the query formulation user interface 150 becomes automatically capable of assisting the user 170 in formulating structured queries that refer to the new type of annotation, merely in response to the addition of the annotation definition 162b to the query language definition 160, and without the need to pause, recompile, re-launch, re-boot, or otherwise reconfigure the system 100 or any component thereof.

For example, the query formulation user interface 150 may provide the user 170 with a drop-down list of permissible terms (such as names of annotation types) which may be inserted into the query at the current cursor location. This list may include a name or other identifier of the new annotation type (e.g., "SmokingStatus" or "Smoking Status"). The user 170 may select such a name or other identifier and thereby cause the query formulation user interface 150 to add a term to the structured query 154 which refers to the new annotation type. The query formulation user interface 150 may generate the drop-down list by obtaining information from the query language definition 160 about the types of annotation defined by the annotation types 162a-d.

As another example, the query formulation user interface may include an "auto-complete" feature which may prompt the user 170 with permissible terms to complete the term currently being typed by the user 170 in the process of formulating the structured query 154. Such permissible terms may include a name or other identifier of the newly-added annotation type. For example, in the process of typing the structured query 154 the user 170 types "Smok", the query user interface 150 may provide "SmokingStatus" as a permissible completion of "Smok". The user 170 may then select "SmokingStatus" and thereby cause the query formulation user interface 150 to add the term "SmokingStatus" to the structured query 154. The user 170 may add other terms to the structured query 154 as desired.

The query formulation user interface 150 may provide the resulting structured query 154 to the search engine 120, which may perform a structured search on the document corpus 104 based on the structured query 154, thereby producing search results 122 (FIG. 3, step 318). The search engine 120 may provide the search results 122 to the user 170 (FIG. 3, step 320).

As mentioned above, the search engine 120 has access to the query language definition 160 and therefore may process the structured query 154 even if the structured query 154 refers to the new type of annotation whose definition 162b has just been added to the query language definition 160. In other words, the search engine 120 becomes automatically capable of processing structured queries that refer to the new type of annotation, merely in response to the addition of the annotation definition 162b to the query language definition 160, and without the need to pause, recompile, re-launch, re-boot, or otherwise reconfigure the system 100 or any component thereof.

The process of performing the structured search (FIG. 3, step 318) may involve two steps: selection and projection. The sub-components of the search engine 120 which perform selection and projection (not shown) may have access to the query language definition 160 and may therefore perform selection and projection, respectively, using query terms that refer to the type of annotation whose definition 162b has just been added to the query language definition 160.

Consider, for example, a query such as "<.SmokingStatus.packsPerDay>2 AND .SmokingStatus.status=ACTIVE". The selection component of the search engine 120 may process such a query by selecting, from the patients described by the document corpus 104, all patients who are currently smoking more than two packs per day.

As another example, consider the query "GET SmokingStatus FOR .finding.code isA <Neoplasm>". This query contains a selection request ("FOR .finding.code isA <Neoplasm>") and a projection request ("GET SmokingStatus"). The selection component of the search engine 120 may process such a query by processing the selection request to find all documents in the document corpus 104 that contain discussion of a clinical finding of any kind of neoplasm, and by processing the projection request to return the smoking status of patients described within the document corpus 104 which resulted from the selection request.

In general, therefore, the queries that may be formed using the query language defined by the query language definition 160 may grow and change over time, automatically and in response to changes in the annotations contained within the document corpus 104 over time.

As the description above makes clear, embodiments of the present invention have a variety of advantages. For example, the techniques disclosed herein enable highly-specific structured queries to be processed with great reliability because the set of searchable annotation types corresponds directly to structured content within the document corpus 104, and because the processed queries may make reference specifically to such annotation types, rather than merely to flat text. This enables structured queries to take into account the semantic and/or syntactic meaning of the content in the document corpus 104, thereby reducing both false positives and false negatives.

Another advantage of embodiments of the present invention is that they enable the query language that is used to search documents to be dynamically extensible. Such extensions may be made automatically in response to changes in the corresponding searchable structured documents 104a-n in the document corpus 104. As a result, no additional effort is required on the part of end users or system administrators to make such extensions. Furthermore, as a result of such automatic and dynamic extension, it is always possible at any point in time for users to formulate queries that reflect the most current state of the documents 104a-n, and it is always possible at any point in time for the search engine 120 to process such queries. This enables queries with the maximum possible expressiveness to be performed at any time, thereby increasing the likelihood that users will be able to find the information they need quickly and accurately.

One disadvantage of existing structured query systems is that they require the designers of such systems to create components that annotate unstructured content to transform that content into structured content before it becomes possible to perform structured queries on that content. A related disadvantage of existing structured query systems is that it is necessary to manually configure the query language definitions of such systems to make them capable of performing structured searches on new kinds of structured content. As further described above, a corresponding advantage of unstructured query systems is that they do not require such an up-front investment, and that unstructured queries can be run on any unstructured content without annotating such content. A disadvantage of unstructured query systems, however, is that they cannot perform structured queries and therefore cannot obtain search results with the accuracy and depth of structured query systems.

Embodiments of the present invention address these problems by providing systems that include the advantages of both structured query systems and unstructured query systems. In particular, embodiments of the present invention enable unstructured content to be queried using structured queries, but without requiring the system's designers or administrators to manually reconfigure the system to make it capable of performing such structured queries. Instead, embodiments of the present invention may both automatically annotate unstructured content to transform it into structured content, and automatically update the system's query language definition so that the system can perform structured queries on newly-annotated content. As a result, users of the system can perform structured queries on new content as it is added to the system with a minimum of effort.

Another advantage of embodiments of the present invention is that they may be used to develop an evolving and dynamic understanding of a mixed-content data set, i.e., a data set containing both unstructured content (e.g., narrative text) and structured content (e.g., discrete facts). As unstructured content is annotated, a deeper understanding of the meaning of the unstructured content is gained and recorded in the form of annotations. Dynamically updating the system's query language to enable the system to perform structured queries on the mixed content in the system (including the newly-annotated content) enables information to be extracted from the mixed content more easily. Such information may then be used to further annotate the content. As a result, embodiments of the present invention enable a positive feedback loop in which deeper knowledge of the system's content is gained over time.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

As described above, a structured document is one in which the text and/or other content is marked up with annotations. Such annotations may be within the structured document itself, such as in the form of XML tags. Alternatively, for example, the annotations may be external to the document, but linked to or otherwise associated with the content whose meaning is indicated by the annotations. Although XML is used in connection with the description of various embodiments of the present invention, these are merely examples and do not constitute limitations of the present invention. Annotations may be represented using representations other than XML.

In certain examples mentioned above, structured documents are created by transcribing speech. This is not, however, a limitation of the present invention. Rather, structured documents used in connection with embodiments of the present invention may be created in any manner, not only by transcribing speech. For example, a structured document may be created in accordance with embodiments of the present invention by marking up an existing flat text document with codings (annotations) that encode concepts (e.g., sections) represented by the text within the document.

Although in certain examples described herein reference is made to "text" which is annotated, text is provided merely as an example of a kind of content to which embodiments of the present invention may apply, and does not constitute a limitation of the present invention. Rather, any reference herein to "text" within a document applies equally to audio, video, and/or other content. Similarly, although certain examples described herein involve the use of "documents," the term "documents" as used herein is not limited to document containing or solely containing text. Rather, the term "document" as used herein applies to any data structure, tangibly stored on a computer-readable medium, which contains any kind of content.

Although the query language definition 160 is illustrated in FIGS. 1 and 2A-2D as being distinct from other components of the system 100, this is not a requirement of the present invention. For example, the query language definition 160 may be integrated with one or more of the natural language processing framework 110, the search engine 120, and the query formulation user interface 150. As a result, modifying the query language definition 160 may modify the search engine 120 to produce a modified search engine and/or modify the query formulation user interface 150 to produce a modified query formulation user interface. Different representations of the query language definition 160 may be used by the NLP processing framework 110, the search engine 120, and the query formulation user interface 150. Furthermore, the query language definition 160 may represent the annotation definitions 162*a-d* in any way.

Although the NLP processing components 112*a-n* are shown in being contained within the NLP processing framework in FIGS. 1 and 2A-2D, this is not a limitation of the present invention. Instead, for example, the NLP processing components 112*a-n* may be external to the NLP processing framework 110, in which case the NLP processing components 112*a-n* may be registered with the NLP processing framework 110 so that the NLP processing framework 110 knows which NLP processing components 12*a-n* to use when applying natural language processing to the document corpus 104.

The query formulation user interface 150 is optional. Furthermore, even in cases in which the query formulation user interface 150 is used, it need not be part of the same system as the search engine 120. The structured query 154 may be generated without the use of the query user interface 150. For example, the structured query 154 may be generated automatically by software, rather than by the user 170.

The techniques described above may be implemented, for example, in hardware, software tangibly stored on a computer-readable medium, firmware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

What is claimed is:

1. A method performed by at least one computer processor executing computer program instructions tangibly stored on at least one non-transitory computer-readable medium, wherein the method is for use with a system, the system comprising: (1) a first natural language processing component that parses text within a first document added to a document corpus to generate annotations of a first type within the document corpus, and (2) a search component that performs structured searching of the annotations of the first type but not of annotations of a second type, the method comprising:
    (A) detecting addition of a second document to the document corpus;
    (B) in response to the detection of the addition of the second document to the document corpus, detecting addition to the system of a second natural language processing component that parses text within the second document added to the document corpus to generate the annotations of the second type;
    (C) modifying the search component, in response to the detection of the addition of the second natural language processing component, to enable the search component to perform the structured searching of the annotations of the second type, thereby producing a modified search component;
    (D) receiving a query, the query including a term referring to the annotations of the second type; and
    (E) using the modified search component to perform the structured searching of the annotations of the second type on the document corpus using the query.

2. The method of claim 1, wherein the document corpus does not include any annotations of the second type at the time that (C) is performed.

3. The method of claim 1, wherein (B) comprises adding the second natural language processing component to the system.

4. The method of claim 1, further comprising modifying a query language definition, which includes a definition of the annotations of the first type, to include a definition of the annotations of the second type.

5. A non-transitory computer-readable medium having computer program instructions tangibly stored thereon, wherein the computer program instructions are executable by at least one computer processor to perform a method for use with a system, the system comprising: (1) a first natural language processing component that parses text within a first document added to a document corpus to generate annotations of a first type within the document corpus, and (2) a search component that performs structured searching of the annotations of the first type but not of annotations of a second type, the computer program instructions which, when run on the at least one computer processor, causes the at least one computer processor to:
    (A) detect addition of a second document to the document corpus;
    (B) detect, in response to the detection of the addition of the second document to the document corpus, addition to the system of a second natural language processing component that parses text within the second document added to the document corpus to generate the annotations of the second type;
    (C) modify the search component, in response to the detection of the addition of the second natural language processing component, to enable the search component to perform the structured searching of the annotations of the second type, thereby producing a modified search component;
    (D) receive a query, the query including a term referring to the annotations of the second type; and
    (E) use the modified search component to perform the structured searching of the annotations of the second type on the document corpus using the query.

6. The non-transitory computer-readable medium of claim 5, wherein the document corpus does not include any annotations of the second type at the time that (C) is performed.

7. The non-transitory computer-readable medium of claim 5, wherein (B) comprises adding the second natural language processing component to the system.

* * * * *